Feb. 26, 1929.  1,703,611
L. J. BROWN
SAFETY DEVICE FOR BRAKE BEAMS AND THE LIKE
Filed March 9, 1925
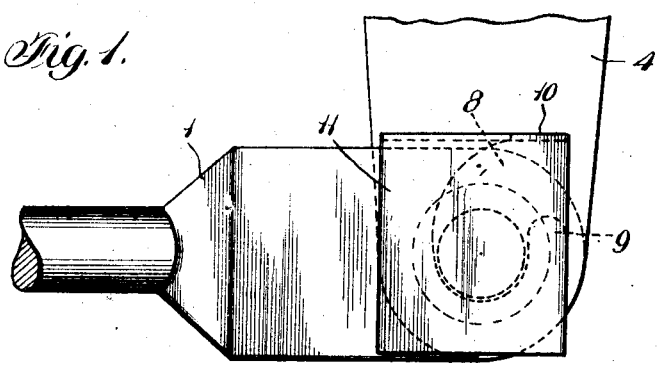
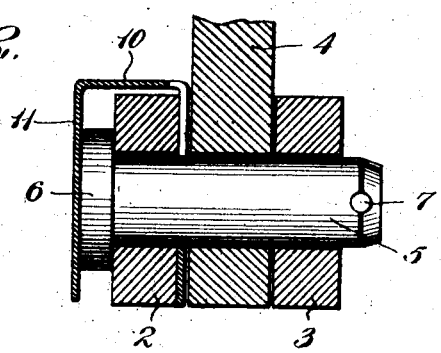
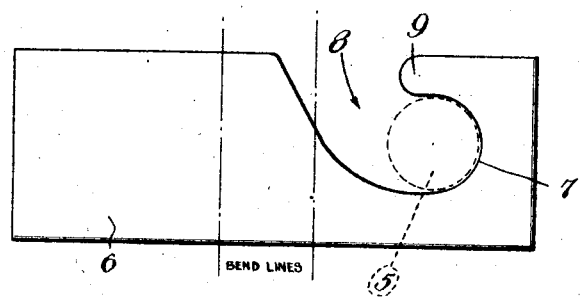
INVENTOR
Lloyd J. Brown
BY
ATTORNEY Patented Feb. 26, 1929.

1,703,611

UNITED STATES PATENT OFFICE.

LLOYD J. BROWN, OF EVANSTON, ILLINOIS, ASSIGNOR TO E. PAYSON SMITH, OF SPRINGFIELD, ILLINOIS.

SAFETY DEVICE FOR BRAKE BEAMS AND THE LIKE.

Application filed March 9, 1925. Serial No. 14,249.

This invention relates to improvements in safety devices for railroad rolling stock including locomotives, generally, but more particularly for brake beams and the like.

The primary object of my invention is to provide a safety device which can be applied and detached without removing the brake pin from normal operative applied position.

A further object of my invention is to provide a device of this character that is simple, cheap to manufacture, but very efficient.

Car repairers and car builders at times fail to spread the cotter keys which are commonly used to lock the pins for brake levers, brake hangers, and brake fulcrums, and in other locations where pins are used. Again cotter keys frequently fail in service by breaking and either cause or permit the pins to work out whereupon the brake riggings fall to the track which is the cause of many railroad wrecks.

If the brake rigging falls the air brake mechanism is out of service rendering the brakes inoperative. In addition to the loss of braking power on the car, the United States safety appliance regulations require the brake to be in good braking condition and they attach a penalty defect to cars found in this condition and the fines levied by the commission amount during the year to a considerable sum against a railroad.

Among other advantages resulting from my invention may be mentioned the fact that where my device is used a shorter brake pin may be used than where a cotter pin is used, besides which it is not necessary to drill a cotter pin hole through the pin. Some railroads prefer to use the usual length of brake pin and also the cotter pin, but this does not prevent the use of my improved safety device.

My invention consists of a safety device which can be applied and detached without disturbing the normal and operative position of the parts.

My invention consists of a flat plate body which can be secured to and detached from the pin after the pin is in its assembled position whereby the pin is absolutely prevented from working out of its operative position thus preventing the falling down of the parts suspended or held thereby.

In the drawings:

Figure 1 is a top plan view of portions of a connection and brake lever hanger with my safety device applied.

Figure 2 is a sectional view on the lines 2—2, Figure 1.

Figure 3 is a plan view of my safety device as manufactured ready for service.

The reference numeral 1 designates a connection rod of any approved type or construction having the forked or other ends 2 and 3 to which one end of the brake lever 4 is secured by means of the connecting pin 5. The pin 5 is provided with the head 6, and a cotter pin hole 7, but the construction of pin is immaterial as far as my invention is concerned.

My improved safety device ready for sale and application consists of a flat metal body 6 comparatively narrow and long, in length it would probably be six or seven inches and possibly two and one quarter inches in width, but these dimensions may be varied to meet the wishes of the railroads without impairing the efficiency of my invention. Preferably, the body 6 is made of resilient metal or metal having some spring, to enable it to stand up and remain serviceable notwithstanding the many times it may be bent in applying and detaching it.

The safety device is provided with a hole 7 extending therethrough near one end thereof as best seen in Figure 3. One side of this pin opening or recess 7 is interrupted by a port, slot or the like 8 which opens up through one side edge face of the body 6, said slot or port merging into said opening or recess at one side thereof, thereby providing an overhang 9 for the opening 7 whereby the safety device cannot be applied to or detached from the pin 5 by a movement at right angles to the axis of the pin 5, and can only be applied or detached by a movement oblique to the axis of the pin, and then by a movement in the direction of the length of the body 6, so that after being in position on the pin 5 the body 6 may hang pendant from the pin with little liability of its loss inasmuch as the overhang 9 extends more than a half circle.

The safety device having been thus far applied on the pin between one of the forks 2 or 3, and the brake lever 4 (see Figure 2) the body 6 beyond the hole 7 is bent outwardly as at 10 and thence at right angles, as at 11 to a position over the head of the pin 5, whereby pin 5 is securely locked against displacement from operative position without using any other securing devices, as will be readily appreciated on examining Figure 2 of the drawings.

It will be understood that with the pin 5 in the opening 7 these parts are drawn into intimate relation by the drawing action incident to making the bend 10 and the parts are held in this position because this bent portion 10 is prevented from moving for any appreciable distance toward the pin by reason of the edge face of the fork 2.

I am aware that some changes may be made in the construction elected to illustrate my invention without departing from the scope of the appended claim.

What I claim is:

A lock of the character described comprising two substantially parallel arms, a spacing member connecting these arms at one end, a bolt hole through one of said arms near its free end, a port leading into said hole from one side edge of said arm, and an overhang extending beyond the center of said hole and toward said port.

In testimony whereof I affix my signature.

LLOYD J. BROWN.